(12) United States Patent
Brown et al.

(10) Patent No.: US 7,409,913 B1
(45) Date of Patent: Aug. 12, 2008

(54) SINGLE-AXIS PROGRAMMABLE POSITIONING DEVICE

(75) Inventors: Michael Brown, Arlington, MA (US); Richard Hersey, Medfield, MA (US); James Ofria, Andover, MA (US)

(73) Assignee: Automec, Inc., Waltham, MA (US)

( * ) Notice: Subject to any disclaimer, the term of this patent is extended or adjusted under 35 U.S.C. 154(b) by 369 days.

(21) Appl. No.: 11/337,434

(22) Filed: Jan. 23, 2006

(51) Int. Cl.
 *B61B 7/00* (2006.01)
(52) U.S. Cl. .................. 104/172.3; 104/96; 104/106
(58) Field of Classification Search ................ 74/89.31, 74/89.33, 89.4; 104/88.01, 96, 106, 172.1, 104/172.2, 172.3, 172.4, 172.5; 198/718, 198/732
 See application file for complete search history.

(56) References Cited

U.S. PATENT DOCUMENTS 4,715,241 A 12/1987 Lipinski et al.
5,133,264 A * 7/1992 Belanger et al. ......... 104/172.3
5,228,392 A * 7/1993 Belanger et al. ......... 104/172.3
5,443,014 A * 8/1995 Belanger et al. ......... 104/172.3
6,983,980 B2 * 1/2006 Rasmussen ................ 296/156

OTHER PUBLICATIONS

TecTool Kwikstop Brochure, 1999.
Precision Automation TigerStop Brochure and Manual, 2000.
Kentucky Gauge Product Guide, 2004.

* cited by examiner

*Primary Examiner*—Lars A Olson
(74) *Attorney, Agent, or Firm*—Altman & Martin; Steven K Martin

(57) ABSTRACT

A single-axis programmable positioning device for positioning a work piece in a work area comprising. The device includes a rail with a pair of parallel channels, a trolley with bearing that ride in the rails, a work piece stop mounted to the trolley, a motor assembly that drives a drive sprocket. A chain extends from one of the bearings, through one channel, around the drive sprocket, through the second channel, around an idler sprocket, and back through the first channel to the bearing. A control panel controls the operation of the device. Optionally, the device includes a magnetic brake for maintaining the position of the trolley between movements.

14 Claims, 3 Drawing Sheets

SINGLE-AXIS PROGRAMMABLE POSITIONING DEVICE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to positioning devices, more particularly, to single-axis drive systems for precision positioning of machine stock for cutting or the like.

2. Description of the Related Art

Single-axis programmable positioning devices for precision positioning of work pieces in cutting machines, also know as linear gauges and adjustable stops, are known. The positioning basic device has a linear rail on which rides a trolley. The trolley travels back and forth on the rail by means of a drive mechanism that is controllable either manually, under computer control, or a combination of the two. The trolley includes a stop, which contacts the work piece. As the trolley moves, the stop pushes the work piece linearly through a work area. The work area may be, for example, under a saw or a drill press.

Typically, the positioning device can be programmed with a sequence of positions to which the trolley will move. In some scenarios, the trolley is moved to the next position by an operator touching a button. In other scenarios, the trolley moves to the next position on completion of an action. For example, when used with a drill press, the act of raising the drill press causes the trolley to move to the next position.

In some configurations, the positioning device mounts along side a roller table on which the work piece moves as it is being pushed by the positioning device.

In the current art, three types of drive systems are used, screw drives, rack and pinion drives, and belt drives. In a screw drive, a motor spins a threaded rod that extends through a threaded aperture on the trolley. As the motor rotates, the trolley moves along the rail. Screw drives are the most accurate. They are found only in high-end (expensive) systems because the very long, machined screw is a costly component.

In a rack and pinion drive, a motor spins a pinion that is meshed with a rack, to which the trolley is mounted. As the pinion turns, the rack and trolley move linearly. Rack and pinion drives are accurate. Like screw drives, they are found only in high-end systems because the very long, machined rack is a costly component.

In a belt drive, a motor drives a belt that extends between a sprockets or pulleys at each end of the rail. The trolley is attached to one location on the belt. As the motor rotates, the trolley moves along the rail. Belt drives are the least accurate because the belt has a tendency to stretch. Because of the lack of accuracy and the low cost of the belt, belt drives are used in low-end systems.

There exist a need for a single-axis programmable positioning device that approaches the accuracy of the screw or rack and pinion drive at the cost of a belt drive.

BRIEF SUMMARY OF THE INVENTION

An object of the present invention is to provide a single-axis programmable positioning device that approaches the accuracy of the screw or rack and pinion drive at the cost of a belt drive.

Another object is to provide a single-axis programmable positioning device wherein maintaining the position of the stop does not cause motor wear.

The present invention is a single-axis programmable positioning device that employs a chain drive, rather than a screw, rack and pinion, or belt drive of the prior art. The device has a rail, a trolley that rides on the rail, a drive system that move the trolley, and a controller that controls the drive system.

The trolley rides in a channel on the upper surface of the rail on low friction bearings on the underside of the trolley. The trolley also rides in a channel on the side of the rail for stability. The trolley mounts a stop for pushing the work piece through the work area. Preferably, the position of the stop relative to the trolley is adjustable.

The drive system moves the trolley along the rail. While prior art positioning systems use screw, rack and pinion, or belt drives, the present invention uses a chain drive. The primary components of the drive system are a motor, reducer, drive sprocket, chain, idler sprocket, and brake. The motor provides rotary motion to the reducer which drives the drive sprocket. The chain runs from the bearing through the channel, around the drive sprocket, through the other channel, around the idler sprocket at the other end of the rail, and back through the first channel to the bearing. Each end of the chain end is attached to the bearing by one or more pins through the chain links. A number of low-friction pads are attached to the channel floors for the chain to ride on in order to minimize wear of both the channels and the chain.

A magnetic brake maintains the position of the trolley between movements. A disk is fixed to and rotates with the motor. An electromagnet is positioned adjacent to the disk with a small gap in between. When power is applied to the electromagnet, the electromagnet and disk adhere to each other. A spring separates the electromagnet and disk when power is removed.

The controller sets the sequence of trolley positions along the rail. The first position is set relative to a fixed location and subsequent positions can be set either relative to the same fixed position (absolute positioning) or relative to the previous position (relative positioning). The controller uses a rotary encoder on the motor axle to determine the position of the trolley.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
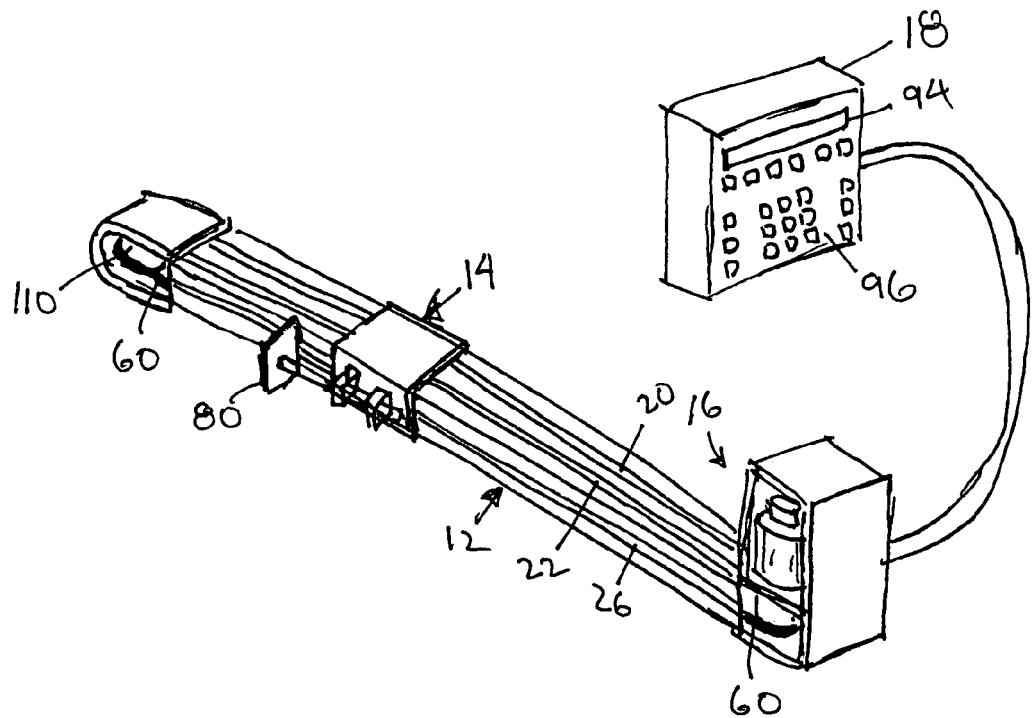
FIG. 1 is a perspective view of the single-axis programmable positioning device of the present invention.

The present invention is a single-axis programmable positioning device that employs a chain drive, rather than a screw, rack and pinion, or belt drive of the prior art. The chain drive combines the economy of a belt drive with nearly the accuracy of a screw or rack and pinion drive. As shown in FIG. 1, the device 10 has several major components: a rail 12, a trolley 14, a drive system 16, and a controller 18.

Figure 2:
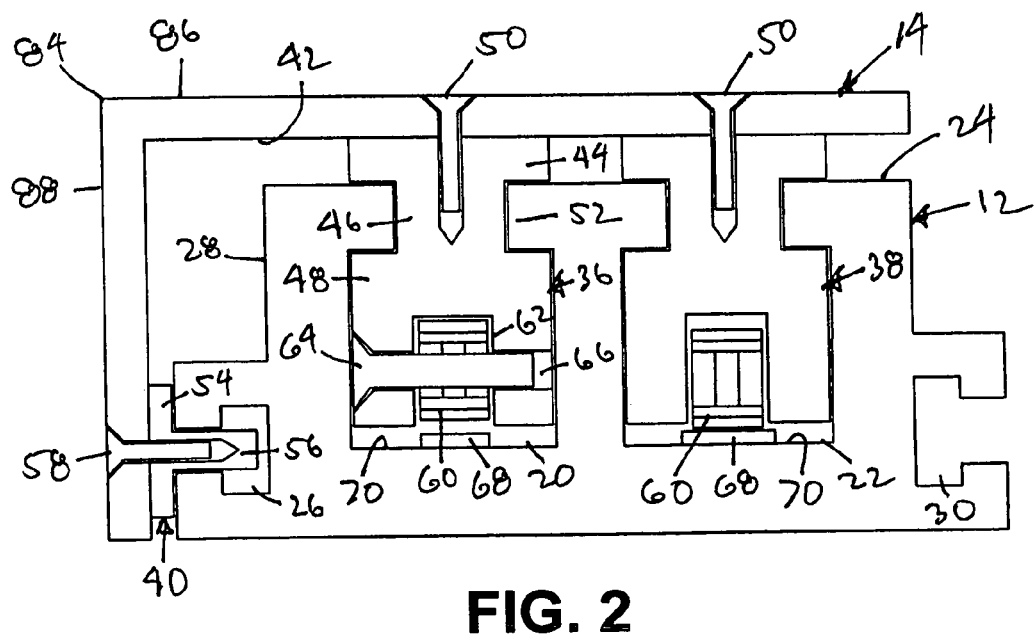
FIG. 2 is a side cross-sectional view of the rail and trolley showing how they are related.

The rail 12 is a metallic extrusion on which the trolley 14 rides. A cross section of the current configuration is shown in FIG. 2. The rail 12 includes four channels, two upper channels 20, 22 in the upper surface 24, a side channel 26 in one side wall 28, and a mounting channel 30 in the other side wall 32. The upper channels 20, 22, 26 provide a guide for the trolley 14. Bearings 36, 38, 40 mounted to underside 42 of the trolley 14 ride within the channels 20, 22, 26. The upper bearings 36, 38 have a cap 44, a throat 46, and a base 48. The trolley 14 is removably mounted to the cap 48 via screws 50. The throat 46 is designed to mate with short protrusions 52 in the opening of the channel 20, 22. The base 48 rides within the channel 20, 22. This arrangement allows the bearings 36, 38 to move linearly within the channels 20, 22 without being removable except at the end of the rail 12.

The side bearing 40 is T-shaped. The cross member 54 is removably mounted vertically to the underside 42 of the trolley via a screw 58 and the horizontal member 56 rides in the side channel 26. This bearing 40 minimizes vertical movement of the trolley 14.

In the present configuration of the positioning device 10, the trolley 14 rides on the upper surface 24 of the rail 12. The present invention also contemplates that the trolley 14 can ride on any surface of the rail 12, including either side and/or the bottom surface.

The bearings 36, 38, 40 are composed of a material that is both durable and low friction. Preferred materials include an acetal polymer, one type of which goes by the trade name DELRIN. Any material that provides acceptable durability and low friction are contemplated for use by the present invention.

The trolley 14 is a platform for mounting the stop 80. In the present configuration, the trolley 14 is a metal sheet that has a single bend 84 so that the trolley 14 has an L-shaped cross-section. The upper bearings 36, 38 are mounted to the upper section 86 and the side bearing 40 is mounted to the side section 88.

The stop 80 is mounted to the side section 88. When the device 10 is in use, the stop 80 pushes the work piece through the work area. The basic stop 80 is a flat sheet. The present invention also contemplates that the stop 80 may have a shape that is specially designed for a work piece. For example, the stop 80 may include a clamp or hook for attaching to the work piece.

Figure 3:
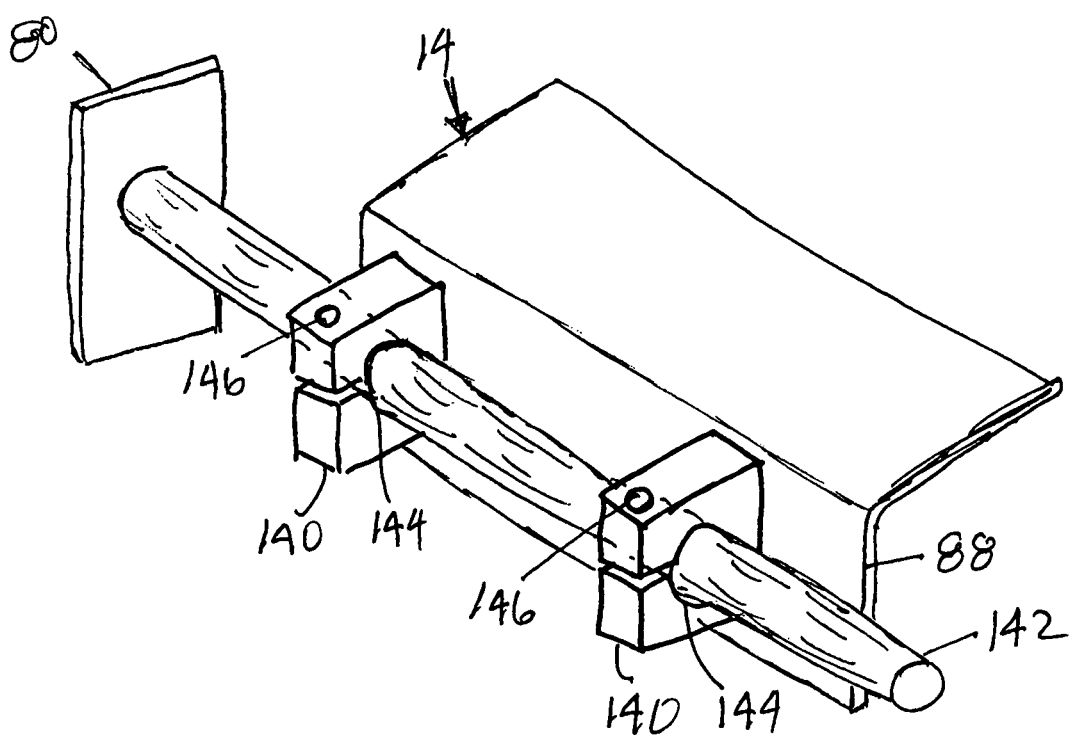
FIG. 3 is a perspective view of one configuration of the stop.

In one embodiment, shown in FIG. 3, the stop 80 is fixed to the trolley 14. In a preferred embodiment, the position of the stop 80 relative to the trolley 14 is adjustable. A pair of clamps 140 extend from the trolley side section 88. The stop 80 is attached to the end of a rod 142 that extends through openings 144 in the clamps 140. The rod 142 is positioned in the clamps 140 so that the stop 80 is at the desired lateral position, and the clamps 140 are tightened by screws 146 to prevent movement of the stop 80 relative to the trolley 14.

Figure 4:
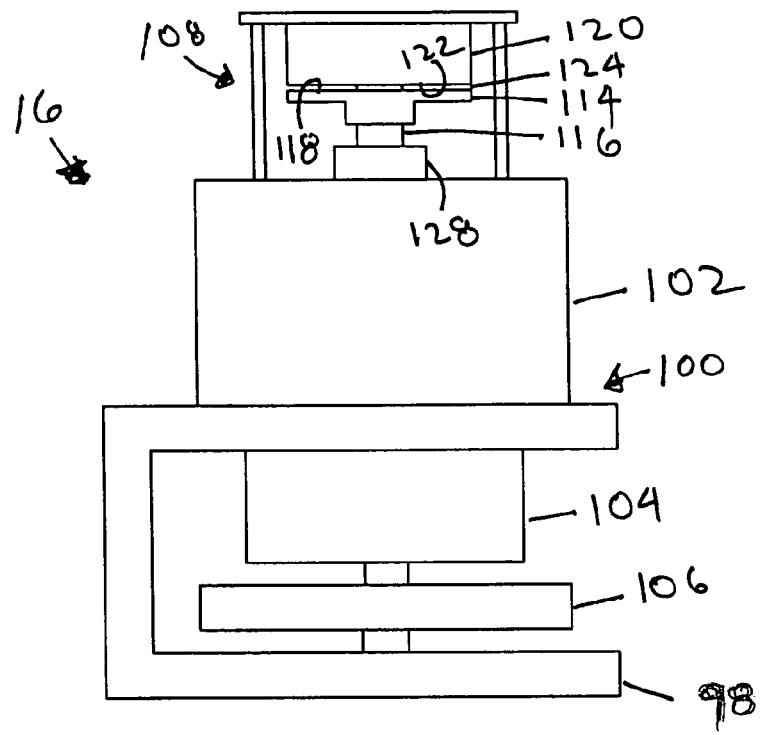
FIG. 4 is a side view of a portion of the drive system without the chain.

The primary improvement over prior art positioning systems is in the drive system 16, which moves the trolley 14 along the rail 12. As indicated above, prior art positioning systems use screw, rack and pinion, or belt drives. The present invention uses a chain drive. The primary components of the present drive system 16 are a motor assembly 100, a drive sprocket 106, a brake 108, a chain 60, and an idler sprocket 110. As shown in FIG. 4, the motor assembly 100 includes a motor 102 and a reducer 104. The motor 102 is mounted to a frame 98 and provides rotary motion to the reducer 104, a series of gears that reduces the speed of the motor 102 to one that is more appropriate for driving the chain 60.

In the present implementation, the motor 102 rotates at 1700 rpm and the reducer 104 has a gear ratio of 9.4. This means that the drive sprocket 106 rotates at 180 rpm. The circumference of the drive sprocket 106 is 4.4", so the trolley moves 4.5" for each rotation of the drive sprocket 106. This results in a trolley speed of 812"/min or about 13.5"/sec.

The reducer 104 drives the drive sprocket 106. The motor/reducer/drive sprocket assembly is located at one end of the rail 12.

Figure 5:
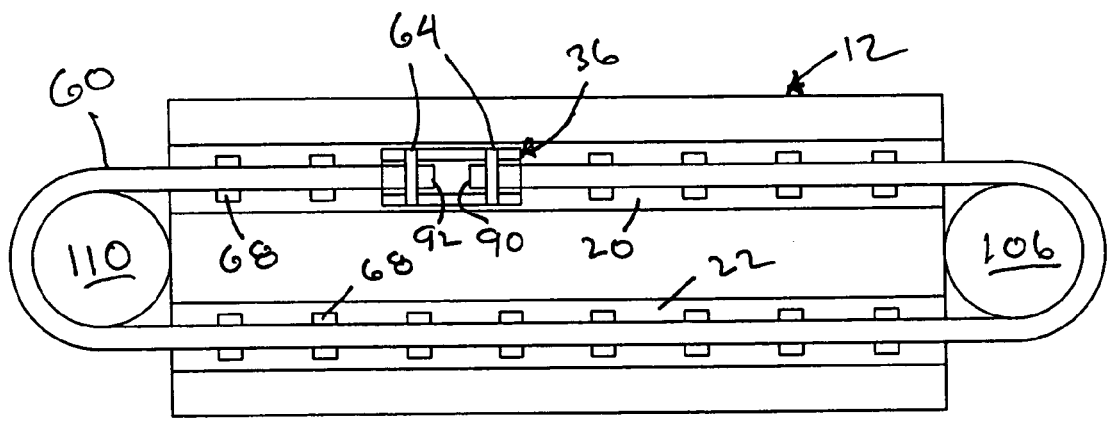
FIG. 5 is a top cross-sectional view showing the path of the chain.

In the present embodiment, the chain 60 is not continuous, that is, the chain 60 does not form a closed loop, but has two free ends. One end 90 of the chain 60 is attached to a slot 62 in one of the trolley's upper bearings 36, as shown in FIGS. 2 and 5. The chain 60 extends from the bearing 36 through the first upper channel 20, around the drive sprocket 106, through the second upper channel 22, around the idler sprocket 110 at the opposite end of the rail 12 from the drive sprocket 106, through the first upper channel 20 back to the bearing 36, where the other end 90 is attached. As shown in FIG. 2, each chain end 90, 92 is attached to the bearing 36 by a pair of pins 64 that extend through holes 66 in the bearing and through links of the chain 60. In the current configuration, the holes 66 are threaded and the pins 64 are screws that are turned into the holes 66.

Alternatively, the chain 60 is a continuous loop that passes through the bearing slot 62 where it is captured by pins 64 through chain links.

As can be seen in FIGS. 2 and 5, a number of pads 68 are attached to the floors 70 of the upper channels 20, 22. These pads 68 provide a surface on which the chain 60 rides. The pads 68 minimize wear of the channels 20, 22 and the chain 60 by preventing metal on metal contact between the rail 12 and chain 60. Like the bearings, the pads 68 are composed of a material that is both durable and low friction.

In some applications of a positioning device, once the trolley is in a new position, the operator will push the work piece against the stop to make sure that the work piece is positioned properly. If there is enough force on the stop, the friction of the reducer and motor can be overcome and the trolley will move, causing the work piece to be positioned incorrectly. Positioning devices of the prior art use a feedback system that relies on the motor to maintain the position of the trolley. If the trolley moves, the movement is detected and the motor is activated to return the trolley to the correct position. This means that the motor will be activated while force is still on the stop, so the motor is acting against an opposing force, causing wear to the motor and possible burnout if the force is great enough.

The positioning device 10 of the present invention employs a magnetic brake 108 to maintain the position of the trolley 14. As shown in FIG. 4, a ferromagnetic disk 114 is attached to the motor shaft 116 so that it spins with the motor 102. The disk 114 has a circular face 118 that is perpendicular to the shaft 116. An electromagnet 120 with face 122 that is the same size and shape as the disk face 118 is positioned adjacent to the disk face 118 with a small gap 124 in between. When power is applied to the electromagnet 120, the electromagnet face 122 attracts and holds the disk 114, preventing the motor 102 from rotating. When power is removed from the electromagnet 120, the spring-biased disk 114 is pulled away from the electromagnet face 122, permitting the motor 102 to rotate.

Alternatively, the electromagnet 120 is spring-biased away from the disk 114 so that when power is applied to the electromagnet, the electromagnet is pulled to the disk, rather than the disk to the electromagnet. When power is removed, the spring bias pulls the electromagnet away from the disk.

When the brake is activated, an operator must push hard to overcome the electromagnetic force of the disk before the trolley 14 will move. In the current configuration, the disk face 118 has an area of about 2.5 square inches and the gap between the faces 118, 122 is about 0.015 inches. To overcome the magnetic brake 108, an operator would have to push against the trolley 14 with at least 200 pounds of force.

The controller 18 controls the operation of the positioning device. Its main purpose is to set the sequence of trolley positions along the rail 12. The controller 18 includes a display 94 and a set of buttons 96 for operation. Typically, the first position will be set relative to a fixed location, such as a location on the rail or within the work area. Subsequent positions can be set either relative to the same fixed position (absolute positioning) or relative to the previous position (relative positioning). For example, if it is desired that the trolley 14 be positioned sequentially at 2", 3", 5", and 8" from the end of the rail 12, the positions can be programmed absolutely as 2", 3", 5", and 8", or the positions can be programmed relatively as 2", 1", 2", and 3", where each programmed position is relative to the previous position.

The controller 18 is also used to program when the trolley will advance, that is, move to the next position of the sequence. Advancement can occur either manually or automatically. For manual advance, a button is pressed to cause the trolley 14 to advance. Several methods can be used for automatic advance. In one method, advancement occurs after a preset period of time. In another method, the occurrence of an event causes advancement such as, for example, the act of raising the drill press.

The controller 18 determines the position of the trolley 14 by means of a rotary encoder 128 on the motor axle 116. As the axle 116 rotates, the amount of rotation is sensed by the encoder 128 and sent to the controller 18. Since the controller 18 knows how far the trolley 14 moves during one rotation of the motor 102, it can calculate how many rotations are necessary to move the trolley 14 a particular distance.

Thus it has been shown and described a single-axis programmable positioning device which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

We claim:

1. A single-axis programmable positioning device for positioning a work piece in a work area comprising:
   (a) a rail having a first end, a second end, a first surface extending therebetween, a first channel in said first surface, and a second channel in said first surface parallel to said first channel;
   (b) a trolley having a first bearing and second bearing, said first bearing riding in said first channel and said second bearing riding in said second channel;
   (c) a work piece stop mounted to said trolley;
   (d) a drive sprocket mounted for rotation at said first end;
   (e) an idler sprocket mounted for rotation at said second end;
   (f) a motor assembly driving said drive sprocket;
   (g) a chain extending around said drive sprocket and said idler sprocket, said chain attached to said trolley such that said trolley moves along said rail as said motor rotates; and
   (h) a controller for controlling operation of said motor.

2. The positioning device of claim 1 wherein said chain extends through said first channel and said second channel.

3. The positioning device of claim 1 wherein a free end of said chain is attached to said first bearing, said chain extending through said first channel, around said drive sprocket, through said second channel, around said idler sprocket, to a second free end attached to said first bearing.

4. The positioning device of claim 1 wherein said chain is continuous and is attached to said trolley at said first bearing.

5. The positioning device of claim 1 wherein said rail has a second surface extending between said first end and said second end, a third channel in said second surface parallel to said first channel, and wherein said trolley has a third bearing that rides in said third channel.

6. The positioning device of claim 1 wherein said stop is adjustably mounted to said trolley.

7. The positioning device of claim 1 further comprising an electromagnetic brake, said brake including a metallic disk with a disk face and an electromagnet with an electromagnet face adjacent to said disk face with a gap therebetween, said disk mounted to the rotor of said motor wherein said disk rotates as said motor rotates and wherein said disk face and said electromagnet face are biased away from each other, whereby when said electromagnet is activated, said disk face and said electromagnet face are pulled together and magnetically adhered and whereby when said electromagnet is deactivated, said disk face and said electromagnet face are pulled apart by said bias.

8. The positioning device of claim 1 wherein said motor assembly includes an electric motor driving a reducer, and wherein said reducer drives said drive sprocket.

9. A single-axis programmable positioning device for positioning a work piece in a work area comprising:
   (a) a rail having a first end, a second end, a first surface extending therebetween, a second surface therebetween, a first channel in said first surface, a second channel in said first surface parallel to said first channel, and a third channel in said second surface parallel to said first channel;
   (b) a trolley having a first bearing, a second bearing, and a third bearing, said first bearing riding in said first channel, said second bearing riding in said second channel, and said third bearing riding in said third channel;
   (c) a work piece stop adjustably mounted to said trolley;
   (d) a drive sprocket mounted for rotation at said first end;
   (e) an idler sprocket mounted for rotation at said second end;
   (f) a motor assembly driving said drive sprocket;
   (g) a chain extending around said drive sprocket and said idler sprocket, said chain attached to said trolley such that said trolley moves along said rail as said motor rotates; and
   (h) a controller for controlling operation of said motor.

10. The positioning device of claim 9 wherein said chain extends through said first channel and said second channel.

11. The positioning device of claim 9 wherein a free end of said chain is attached to said first bearing, said chain extending through said first channel, around said drive sprocket, through said second channel, around said idler sprocket, to a second free end attached to said first bearing.

12. The positioning device of claim 9 wherein said chain is continuous and is attached to said trolley at said first bearing.

13. The positioning device of claim 9 further comprising an electromagnetic brake, said brake including a metallic disk with a disk face and an electromagnet with an electromagnet face adjacent to said disk face with a gap therebetween, said disk mounted to the rotor of said motor wherein said disk rotates as said motor rotates and wherein said disk face and said electromagnet face are biased away from each other, whereby when said electromagnet is activated, said disk face and said electromagnet face are pulled together and magnetically adhered and whereby when said electromagnet is deactivated, said disk face and said electromagnet face are pulled apart by said bias.

14. A single-axis programmable positioning device for positioning a work piece in a work area comprising:

(a) a rail having a first end, a second end, a first surface extending therebetween, a second surface therebetween, a first channel in said first surface, a second channel in said first surface parallel to said first channel, and a third channel in said second surface parallel to said first channel;

(b) a trolley having a first bearing, a second bearing, and a third bearing, said first bearing riding in said first channel, said second bearing riding in said second channel, and said third bearing riding in said third channel;

(c) a work piece stop adjustably mounted to said trolley;

(d) a drive sprocket mounted for rotation at said first end;

(e) an idler sprocket mounted for rotation at said second end;

(f) a motor assembly driving said drive sprocket;

(g) a chain having a free end attached to said first bearing, said chain extending through said first channel, around said drive sprocket, through said second channel, around said idler sprocket, to a second free end attached to said first bearing, wherein said trolley moves along said rail as said motor rotates;

(h) an electromagnetic brake having a metallic disk with a disk face and an electromagnet with an electromagnet face adjacent to said disk face with a gap therebetween, said disk mounted to the rotor of said motor wherein said disk rotates as said motor rotates and wherein said disk face and said electromagnet face are biased away from each other, whereby when said electromagnet is activated, said disk face and said electromagnet face are pulled together and magnetically adhered and whereby when said electromagnet is deactivated, said disk face and said electromagnet face are pulled apart by said bias; and (i) a controller for controlling operation of said motor.

* * * * *